INVENTOR.
Lee G. Daniels
BY Ira J. Wilson
ATTORNEY.

Patented Dec. 26, 1922.

1,439,952

UNITED STATES PATENT OFFICE.

LEE G. DANIELS, OF ROCKFORD, ILLINOIS.

CLUTCH.

Application filed June 7, 1920. Serial No. 387,101.

*To all whom it may concern:*

Be it known that I, LEE G. DANIELS, a citizen of the United States, residing at Rockford, in the county of Winnebago and State of Illinois, have invented certain new and useful Improvements in Clutches, of which the following is a specification.

This invention relates to clutches of the expansible split ring type, and has more particular reference to the means for actuating the expander element.

The primary object of the present invention is to provide an improved clutch of the expansible split ring type, which shall embody a trunnion collar or the like equipped with a cam bar of such novel construction and arrangement as to actuate the expander member for engaging the clutch upon shifting of the collar in one direction and release the clutch at a predetermined point in this movement, permitting the collar to continue in such movement and then retract without interference with the clutch. This action is desirable in certain types of automatic machinery, and I have accordingly devised a simple and novel means for obtaining the desired movements in a clutch of the type in mind.

A further object resides in the provision of a clutch of the character described so designed and constructed as to be thoroughly practical and efficient for the purposes in mind and which shall be capable of production at a comparatively low cost.

Other objects and attendant advantages will be appreciated as the invention becomes better understood by reference to the following description when considered in connection with the accompanying drawings, in which—

Figure 1:
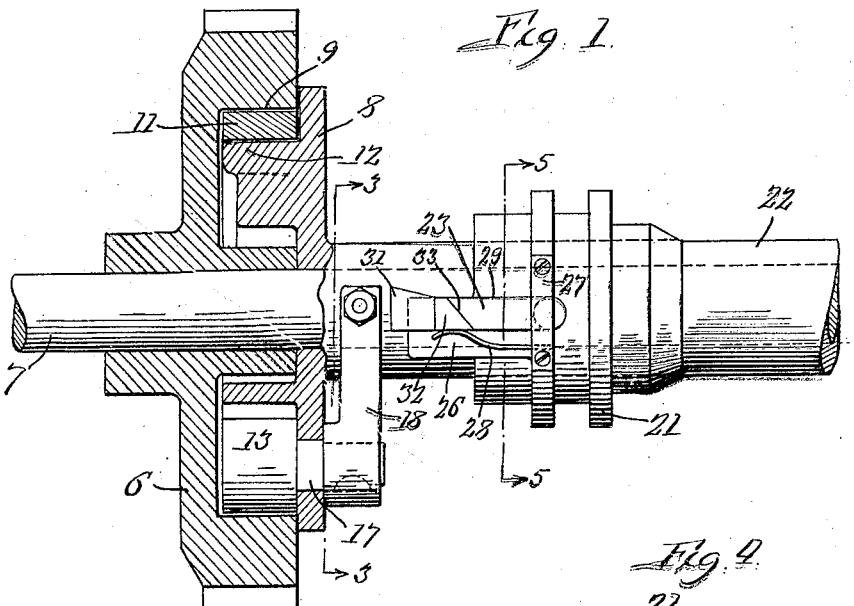
Figure 4:
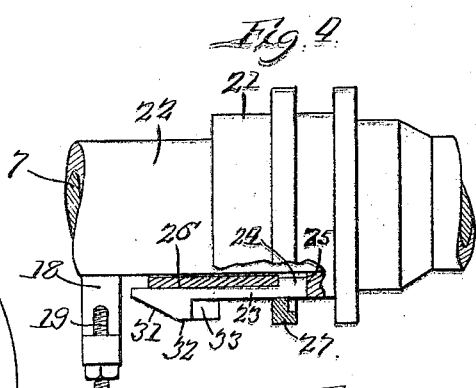
Figure 2:
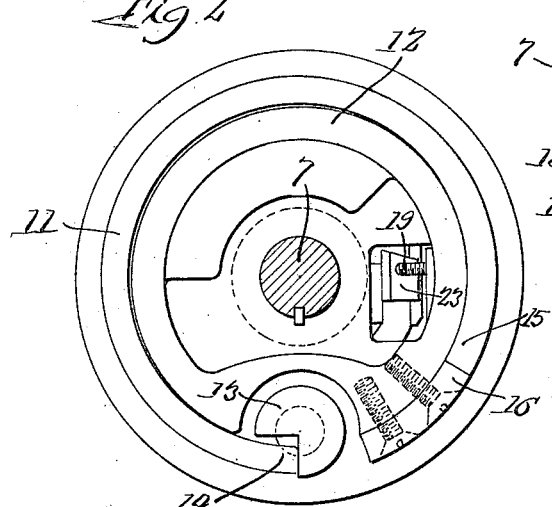
Figure 5:
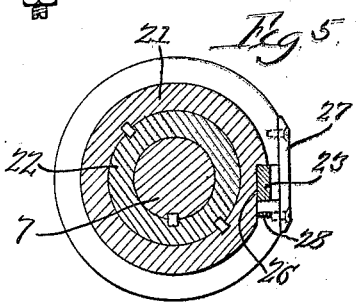
Figure 3:
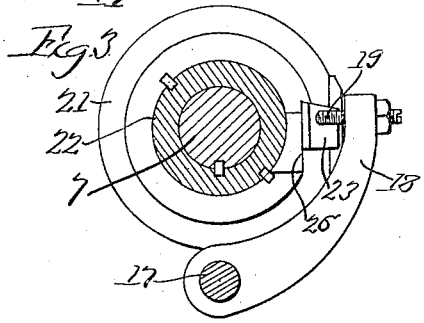

Figure 1 is a side elevation, partly in section, of a clutch embodying my improvements;

Fig. 2, a view of the left hand end of Fig. 1 with the driving member removed;

Fig. 3, a sectional view taken on the line 3—3 of Fig. 1;

Fig. 4, a fragmentary plan view illustrating the mounting of the cam bar and its relation to the expander arm; and Fig. 5, a detail sectional view taken on the line 5—5 of Fig. 1.

In this particular embodiment of my improvement, the driving member 6 is in the form of a gear revoluble upon a supporting shaft 7 which is to be driven through the agency of the driven member 8 of the clutch. The driving and driven members are adapted to be frictionally connected by means of an expansible split ring, and to this end the driving member is constructed to provide an internal face 9 with which the periphery of a split friction ring 11 is adapted to engage. This ring, carried on the segmental flange 12 of the driven member is loose and unconnected to any part, but adapted to be expanded by oscillation of a block 13 which engages and imparts a thrust in a circumferential direction to the end 14 of the ring, the opposite end 15 of which abuts against a block 16 or a suitable stop fixed with respect to the driven member. By oscillation of the block 13 in a clockwise direction, viewing Fig. 2, it will be obvious that the ring 11 will be expanded so as to frictionally engage the surface 9 and thereby connect the driving and driven members. The expander block 13 is formed integral with a shank 17 mounted for rotation in the web of the driven member 8 and equipped at the outer side thereof with a fixed expander arm 18 on the outer end of which is carried an adjustable finger 19. By oscillation of this arm 18, it will be obvious that the clutch may be engaged and disengaged.

Coming now to the means for actuating the expander arm, I employ a collar 21 splined on the sleeve 22 integral with the driven member 8, which collar or carrier is equipped with a cam bar designated generally by character 23 adapted for actuating the expander arm 18. The cam carrier may be shifted by any suitable means, and in the present instance it is in the form of a trunnion collar, the trunnion and shifting yoke being omitted as such constructions are well known in this art. The collar 21 being splined to the sleeve 22, bears at all times substantially the same relation to the expander arm 18 as regards rotative movement, but is shiftable lengthwise on the sleeve with respect to said arm. It will be observed that the cam bar is mounted at its end 24 in a suitable socket 25 in the collar to pivot about a radial axis, and that the cam bar is held against displacement from the seat or ledge 26 by a retaining plate 27 secured to the collar. A suitable spring 28 constantly urges the cam bar against the shoulder 29 on the collar. The outer or forward end of the cam bar has a gradually inclined cam surface 31, the high portion 32 of which terminates in a depression defined at one end by an oblique cam surface 33.

By reason of the foregoing construction, the expander arm 18 will be actuated through engagement of the finger 19 by the cam surface 31 for engaging the clutch when the collar 21 is shifted to the left, viewing Fig. 1. The clutch remains engaged as the collar continues in this shifting movement, until the finger 19 rides over the cam face 33 and drops into the depression formed by this narrow end of the cam bar. Thus, the carriage or collar may continue in this movement to the left for a certain period while the clutch remains disengaged. It is now desired that when the collar is retracted, the cam bar shall not interfere with the expander arm and finger, and to this end it will be manifest that during such retracting movement the cam surface 33 will strike the periphery of the finger 19, causing the cam bar to swing to one side without actuating the clutch, and after the cam bar has entirely cleared the finger the spring 28 will return the bar to its normal position.

A clutch of the foregoing character is especially desirable in automatic machinery wherein the clutch is to be engaged during only a portion of the movement of the clutch-actuating member. The clutch and its actuating means herein provided are especially practical and serviceable for the purposes in mind, and while I have illustrated but a single working embodiment thereof, it should be understood that various changes might be made in details of construction without departing from the spirit and scope of the invention as expressed in the appended claims, in which—

I claim:

1. In a clutch, the combination of driving and driven elements, an expansible shoe for frictionally connecting said elements, an expander arm for expanding said shoe, a collar adapted to be shifted for engaging the clutch, and a cam bar pivotally mounted on the collar and shaped to move the expander arm in a direction to engage the clutch when the collar is shifted in one direction and to release the clutch at a predetermined point in such movement of the collar, permitting the latter to continue in such movement, and further shaped and constructed to swing out of the path of the expander member when the collar is retracted.

2. A friction clutch comprising a shaft, driving and driven members, the former being loose on the shaft and the latter fixed thereto, an expansible friction shoe for frictionally connecting said members, and an oscillatory expander arm for expanding said shoe, a collar splined with respect to the shaft, a cam bar mounted on the collar to pivot about a radial axis and having a cam surface disposed so as to oscillate the expander arm and engage the clutch when the collar is moved in one direction and having a depression permitting the expander arm to release the clutch at a predetermined point in such movement of the collar, and allowing the latter to continue in this movement, and the cam bar being movable laterally about its pivot when the collar is retracted, so as not to interfere with the expander arm.

3. In a clutch of the character described, the combination with driving and driven members adapted to be frictionally connected by means of an expansible split ring, of a shiftable collar, and a cam carried by the collar and adapted by shifting movement thereof to expand and release the clutch when the collar is shifted in one direction and to be rendered inoperative when the collar is shifted in the opposite direction so as not to affect the clutch.

4. In an expansible split ring friction clutch of the character described, a shiftable collar equipped with a cam adapted for expanding and releasing the split ring, the cam being so mounted and constructed as to expand and release the clutch when the collar is shifted in one direction and to be rendered inoperative with respect to actuation of the split ring when the collar is shifted in the opposite direction.

5. In a friction clutch, the combination of a driving and a driven member, means for frictionally engaging said members, and a shiftable collar on one of said members equipped with a spring-pressed movable cam constructed to engage and release the clutch when said collar is shifted in one direction and be rendered inoperative so as not to affect the clutch when shifted in the opposite direction.

LEE G. DANIELS.